(12) United States Patent
Ostergren

(10) Patent No.: US 10,486,654 B2
(45) Date of Patent: Nov. 26, 2019

(54) NOZZLE ASSEMBLY FOR A WINDSHIELD WASHER SYSTEM OF A VEHICLE

(71) Applicant: Illinois Tool Works Inc., Glenview, IL (US)

(72) Inventor: Kristian A. Ostergren, Alingsas (SE)

(73) Assignee: Illinois Tool Works Inc., Glenview, IL (US)

(*) Notice: Subject to any disclaimer, the term of this patent is extended or adjusted under 35 U.S.C. 154(b) by 161 days.

(21) Appl. No.: 15/544,290

(22) PCT Filed: Feb. 17, 2015

(86) PCT No.: PCT/US2015/066336
§ 371 (c)(1),
(2) Date: Jul. 18, 2017

(87) PCT Pub. No.: WO2016/133585
PCT Pub. Date: Aug. 25, 2016

(65) Prior Publication Data
US 2017/0349150 A1    Dec. 7, 2017

Related U.S. Application Data

(60) Provisional application No. 62/117,034, filed on Feb. 17, 2015.

(51) Int. Cl.
| | |
|---|---|
| B60S 1/52 | (2006.01) |
| B05B 1/08 | (2006.01) |
| B05B 15/652 | (2018.01) |
| B05B 1/04 | (2006.01) |
| B05B 1/30 | (2006.01) |

(Continued)

(52) U.S. Cl.
CPC .................... B60S 1/52 (2013.01);
B05B 1/04 (2013.01); B05B 1/06 (2013.01);
B05B 1/08 (2013.01); B05B 1/14 (2013.01);
B05B 1/24 (2013.01);
B05B 1/3026 (2013.01); B05B 9/002 (2013.01); B05B 15/652 (2018.02); B60S 1/487 (2013.01); B60S 1/50 (2013.01)

(58) Field of Classification Search
CPC ... B60S 1/52; B60S 1/487; B05B 1/04; B05B 1/06; B05B 1/08; B05B 1/14; B05B 1/24; B05B 1/3026; B05B 9/002
USPC .... 239/128, 130, 135, 284.1, 548–551, 390, 239/391, 587.1, 587.4, 589.1, DIG. 3
See application file for complete search history.

(56) References Cited

U.S. PATENT DOCUMENTS

| | | | | |
|---|---|---|---|---|
| 3,979,068 A | * | 9/1976 | Applebaum | ............... B05B 1/10 239/284.1 |
| 5,074,471 A | * | 12/1991 | Baumgarten | ........... B60S 1/522 239/284.1 |

(Continued)

FOREIGN PATENT DOCUMENTS

FR          3005018          1/2014

OTHER PUBLICATIONS

International Search Report and Written Opinion for PCT/US2015/066336.

Primary Examiner — Steven J Ganey
(74) Attorney, Agent, or Firm — Quarles & Brady LLP

(57) ABSTRACT

A nozzle assembly of a windshield washer system of a vehicle includes a fluid feed line (106) that is configured to receive washer fluid from a washer fluid storage tank, at least one ball jet line (108, 110) coupled to the fluid feed line, and at least one fluidic line (112) coupled to the fluid feed line.

16 Claims, 7 Drawing Sheets

(51) Int. Cl.
  *B05B 9/00* (2006.01)
  *B60S 1/48* (2006.01)
  *B05B 1/06* (2006.01)
  *B05B 1/14* (2006.01)
  *B05B 1/24* (2006.01)
  *B60S 1/50* (2006.01)

(56) References Cited

U.S. PATENT DOCUMENTS

| | | | |
|---|---|---|---|
| 6,227,462 B1 * | 5/2001 | Chen | B60S 1/487 |
| | | | 239/135 |
| 6,354,515 B1 * | 3/2002 | Matsumoto | B05B 1/14 |
| | | | 239/284.1 |
| 6,554,210 B2 * | 4/2003 | Holt | B05B 7/08 |
| | | | 239/284.1 |
| 2011/0061692 A1 | 3/2011 | Gopalan | |
| 2015/0183404 A1 * | 7/2015 | Romack | B60S 1/485 |
| | | | 239/284.1 |

* cited by examiner

NOZZLE ASSEMBLY FOR A WINDSHIELD WASHER SYSTEM OF A VEHICLE

RELATED APPLICATIONS

This application is a National Phase of International Application No. PCT/US2015/066336, filed Dec. 17, 2015, which relates to and claims priority benefits from U.S. Provisional Patent Application No. 62/117,034 entitled "Nozzle Insert Assembly of a Windshield Washer System of a Vehicle," filed Feb. 17, 2015, both of which are hereby incorporated by reference in their entireties.

FIELD OF EMBODIMENTS OF THE DISCLOSURE

Embodiments of the present disclosure generally relate to a nozzle assembly, and, more particularly, to a nozzle assembly configured to be used with a windshield washer system of a vehicle.

BACKGROUND

Various vehicles, such as automobiles, include a windshield. Wipers are operatively coupled to the windshield and are configured to wipe away rain, snow, ice, and debris from the windshield. For example, during rainy conditions, a driver may activate the wipers to remove water from the windshield.

Often, dirt, dust, debris, and other contaminants stick to a windshield. For example, salt used to melt ice on pavement, dirt, and the like may be deposited on a windshield. In order to remove such contaminants, many vehicles include windshield washer systems. A typical windshield washer system includes a storage tank for wiper fluid. The tank is connected to nozzles proximate to the windshield through one or more tubes or the like. In order to wash the windshield, a driver typically engages a control device, such as a button, switch, or the like, that causes wiper fluid to squirt onto the windshield through one or more nozzles that connect to the tubes.

However, as a vehicle is moving, wipers and wind speed incident on the windshield may cause the water from the nozzles to move in unpredictable patterns. As such, contaminants may remain on the windshield even after the windshield washer system is activated. Moreover, depending on the geometry of a windshield and wiper movement, certain areas may not receive as much cleaning as other areas. Accordingly, the overall cleaning process may be inconsistent.

Accordingly, a need exists for an improved assembly, system, and method configured to efficiently and effectively clean a windshield of a vehicle.

SUMMARY OF EMBODIMENTS OF THE DISCLOSURE

Certain embodiments of the present disclosure provide a nozzle assembly of a windshield washer system of a vehicle. The nozzle assembly may include a fluid feed line that is configured to receive washer fluid from a washer fluid storage tank, at least one ball jet line coupled to the fluid feed line, and at least one fluidic line coupled to the fluid feed line. The ball jet line(s) and the fluidic line(s) may include portions that are disposed within a plane that extends into a longitudinal plane of the nozzle assembly.

The ball jet line(s) removably and selectively retain one of a ball jet or a ball plug. The ball jet is configured to deliver a pressurized and concentrated stream of washer fluid. The fluidic line(s) retains a fluidic insert that is configured to deliver a wide, dispersed stream of washer fluid. Optionally, the fluidic line(s) may retain a fluidic plug.

In at least one embodiment, a first ball jet line is positioned in relation to a first side of a central fluidic line. A second ball jet line is positioned in relation to a second side of the central fluidic line that is opposite from the first side.

The first ball jet line may retain a first ball jet, while the second ball jet line may retain a first ball plug. In at least one other embodiment, the first ball jet line may retain a first ball jet, and the second ball jet line may retain a second ball jet. In at least one other embodiment, the first ball jet line may retain a first ball plug, and the second ball jet line may retain a second ball plug.

The nozzle assembly may also include a connecting bracket that is configured to secure the nozzle assembly to a portion of the vehicle. A position of the connecting bracket in relation to the nozzle assembly may be adjustable.

The nozzle assembly may include at least one heating element that is configured to heat the washer fluid. The nozzle assembly may include a valve that is configured to control flow of the washer fluid.

Certain embodiments of the present disclosure provide a windshield washer system configured to clean a windshield of a vehicle. The windshield washer system may include a washer fluid storage tank configured to retain washer fluid, and at least one nozzle assembly connected to the washer fluid storage tank through at least one fluid delivery tube.

Certain embodiments of the present disclosure provide a nozzle assembly of a windshield washer system of a vehicle. The nozzle assembly may include a fluid feed line that is configured to receive washer fluid from a washer fluid storage tank, a central fluidic line coupled to the fluid feed line (in which the central fluidic line has a first side and a second side that is opposite from the first side), a fluidic insert removably retained by the central fluidic line (the fluid insert is configured to deliver a wide, dispersed stream of washer fluid), a first ball jet line coupled to the fluid feed line, and a second ball jet line coupled to the fluid feed line. The first ball jet line is positioned in relation to the first side of the central fluidic line, and removably and selectively retains one of a first ball jet or a first ball plug. The first ball jet is configured to deliver a first pressurized and concentrated stream of washer fluid. The second ball jet line is positioned in relation to the second side of the central fluidic line, and removably and selectively retains one of a second ball jet or a second ball plug. The second ball jet is configured to deliver a second pressurized and concentrated stream of washer fluid. The nozzle assembly may also include a connecting bracket that is configured to secure the nozzle assembly to a portion of the vehicle. A position of the connecting bracket in relation to the nozzle assembly is adjustable.

Figure 1:
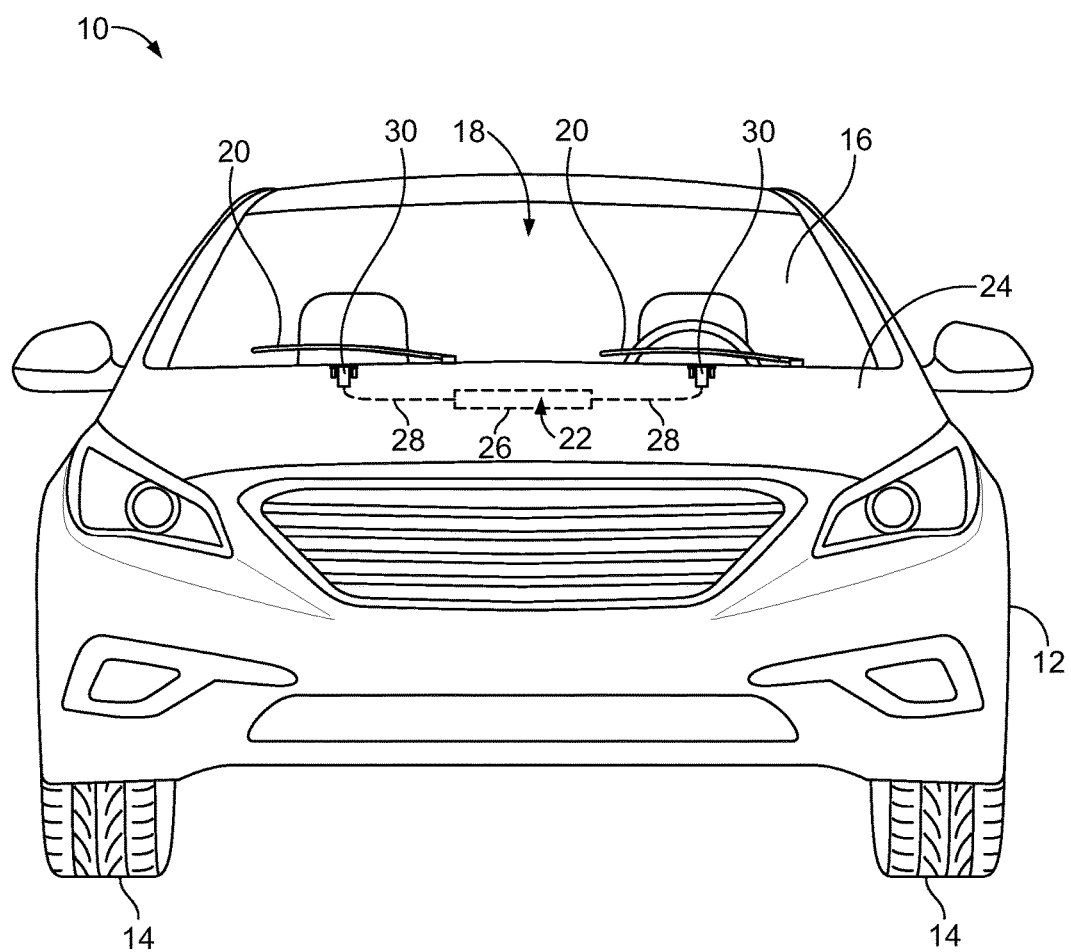
FIG. 1 illustrates a front view of a vehicle, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a nozzle assembly that may be used with a windshield washer system of a vehicle. The nozzle assembly may include one or more ball jets, one or more fluidic inserts, and one or more ball plugs.

A ball jet is a spherical or semispherical ball with a channel passing therethrough. The ball jet may be various sizes, as desired. For example, a large ball jet fits into a reciprocally-shaped large opening within the nozzle assembly. Conversely, a small ball jet fits into a reciprocally-shaped small opening within the nozzle assembly. As the size of the opening increases, a size of a feeding line/channel may also be increased. For example, a diameter of the feeding channel may be directly proportional to a size of the opening that retains the ball jet. Further, a longer feeding channel may be used so that outlets may be aligned with one another for increased performance (so as to be able to output washer fluid over a longer or wider area).

The ball jet may be pressed into a reciprocal, spherical opening in an insert assembly. The ball jet is configured to allow adjustment in various directions (such as by the ball jet being rotated within the opening through the use of a tool to tune the output to a desired location). The ball jet may be formed of plastic, for example. It has been found that a plastic ball jet is less susceptible to clogging, as compared to metal ball jets, for example. Alternatively, however, the ball jet may be formed of metal, such as brass.

FIG. 1 illustrates a front view of a vehicle 10, according to an embodiment of the present disclosure. The vehicle 10 may be an automobile, such as a car, truck, or the like. Optionally, the vehicle 10 may be a commercial truck, locomotive, boat, or various other types of vehicles that may employ windshield wipers.

The vehicle 10 includes a main body 12, which may be supported by one or more wheels 14. A windshield 16 may protect an internal cabin 18 from wind and the elements, such as rain, snow, dirt, debris, and the like. One or more windshield wipers 20 are operatively coupled to the windshield 16 and are configured to wipe liquids, dirt, debris, and the like off the windshield 16.

A windshield washer system 22 may be secured within the vehicle 22, such as connected to a frame underneath a hood 24. The windshield washer system 22 may include a washer fluid storage tank 26 that contains washer fluid. The washer fluid storage tank 26 is coupled to one or more fluid delivery tubes 28 that connect to one or more nozzle assemblies 30 that are configured to emit the washer fluid onto the windshield 16.

Figure 2:
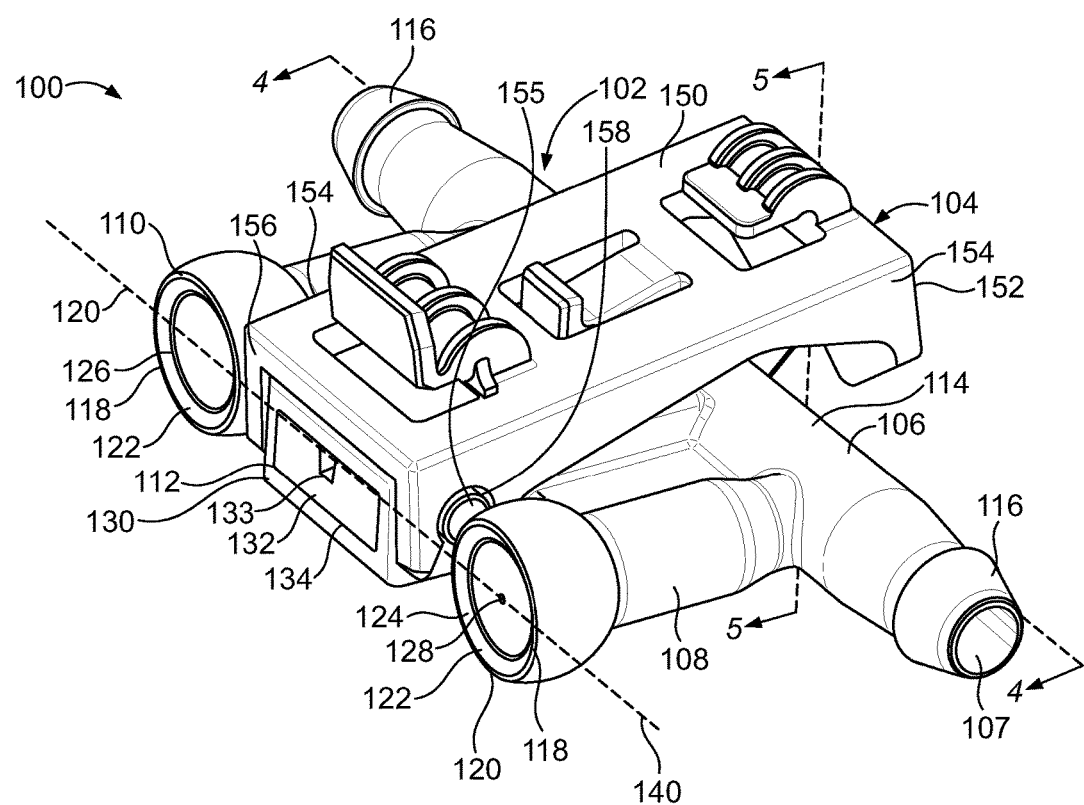
FIG. 2 illustrates a perspective top view of a nozzle assembly, according to an embodiment of the present disclosure.

FIG. 2 illustrates a perspective top view of a nozzle assembly 100, according to an embodiment of the present disclosure. The nozzle assembly 100 is an example of nozzle assembly 30 as shown and described with respect to FIG. 1.

The nozzle assembly 100 may include a main housing 102, and a connecting bracket 104 that may be used to secure the nozzle assembly 100 to a portion of a vehicle, such as on an internal frame proximate to a windshield of a vehicle. The main housing 100 may include a central fluid feed line 106 having a fluid delivery channel 107 that allows washer fluid to be delivered or otherwise fed to ball jet lines 108, 110 and a fluidic line 112.

As shown, the fluidic line 112 may be centrally positioned between the ball jet lines 108 and 110. The ball jet line 108 may be positioned to one side of the central fluidic line 112, while the ball jet line 110 may be positioned to an opposite side of the central fluidic line 112. The ball jet lines 108 and 110 may straddle the fluidic line 112.

The ball jet lines 108, 110 and the fluidic line 112 may be linearly aligned along a common line or plane 140. That is, each of the ball jet lines 108, 110, and the fluidic line 112 may include one or more portions that are disposed within a single linear plane 140 that extends through a length of the nozzle assembly 100.

Alternatively, the fluidic line 112 may not be centrally positioned between the ball jet lines 108 and 110. For example, the fluidic line 112 may be positioned such that both ball jet lines 108 and 110 are to one side of the fluidic line 112. In at least one other embodiment, the fluidic line 112 may be above, below, and/or diagonally positioned with respect to one or both of the ball jet lines 108 and 110. In at least one embodiment, the ball jet lines 108 and 110 may both be positioned above or below the fluidic line 112.

The central fluid feed line 106 is configured to receive washer fluid from a washer storage tank and feed or otherwise deliver the washer fluid to the ball jet lines 108, 110 and the fluidic line 112. The fluid feed line 106 may include a cylindrical conduit 114 having beveled or tapered fittings 116 on either end. The tapered fittings 116 are configured to connect to flexible tubes (such as rubber tubes) that connect to a washer fluid storage tank. While shown with two open ends, the central fluid feed line 106 may have more or less fittings 116 than shown. For example, the central fluid feed line 106 may have a single tapered fitting 116 that is configured to connect to a flexible tube. Additionally, various other fittings configurations other than shown may be used. For example, a non-tapered or non-beveled fitting may be used.

The fluid delivery channel 107 of the central fluid feed line 106 is in fluid communication with ball jet channels and a fluidic channel formed through the ball jet lines 108, 110, and the fluidic line 112, respectively. Each ball jet line 108 and 110 includes an expanded bearing 118 at a distal end 120. The bearing 118 includes an internal chamber 122 that is configured to receive and rotatably retain a ball jet 124 or a ball plug 126. The internal chamber 122 may be spherical or semispherical. As shown, a ball jet 124 having a fluid outlet 128 is rotatably retained within the bearing 118 of the ball jet line 108, while a ball plug 126 (which does not include a fluid outlet) is retained within the bearing 118 of the ball jet line 110. Optionally, the ball jet line 108 may retain a ball plug, while the ball jet line 110 may retain a ball jet. In at least one other embodiment, both the ball jet line 108 and the ball jet line 110 may include ball jets. In at least one other embodiment, both the ball jet line 108 and the ball jet line 110 may include ball plugs.

The ball plugs 126 and the ball jets 124 may be removably and interchangeably retained within the bearings 118 of the ball jet lines 108 and 110. As such, the ball jet 124 may be removed and replaced with a ball plug or another ball jet, while the ball plug 126 may be removed and replaced with a ball jet or another ball plug.

Each ball jet 124 and ball plug 126 may be secured in position in a respective bearing 118 through a frictional interface that prevents, minimizes, or reduces inadvertent rotation of the ball jet 124 and/or the ball plug 126. In order to adjust the position of the ball jet 124, for example, a tool, such as a needle, may be used to engage the ball jet 124 and rotate it to a different position.

If desired, ball jets may be operatively secured within a receptacle or opening formed in one or both outlets. If desired, ball plugs may be inserted in one or both of the ball jet outlets, to block fluid from passing out of the one or more ball jet outlets. A fluidic insert may be secured within the fluidic outlet. Accordingly, embodiments of the present disclosure provide a nozzle insert assembly that allows use at least one both ball jet output and at least one fluidic output.

The fluidic line 112 may include an internal chamber 130 that receives and retains a fluidic insert 132, such as through a snap fit, a latching engagement, an interference fit, a press fit, and/or the like. The fluidic insert 132 may be a block-shaped cartridge having a fluid channel formed therethrough. The fluidic insert 132 is retained within the internal chamber 130, which has a reciprocal shape in relation to the fluidic insert 130. The shape of the internal chamber 130 may prevent the fluid insert 132 from shifting, rotating, or otherwise moving therein. For example, the rectangular cross-section of the internal chamber 130 locks the fluid insert 132 in place. In contrast to the ball jet 124, which may be rotatable within the bearing 118 of the ball jet line 108, the fluidic insert 132 may remain fixed in position when it is inserted into the internal chamber 130. The fluidic insert 132 may be removed from the internal chamber 130 and replaced by another fluidic insert, or a block-shaped plug. For example, a fluidic plug may be sized and shaped the same as the fluidic insert 132, but may be devoid of any internal fluid channel that allows fluid to pass therethrough.

The fluidic insert 132 includes an outlet 133 at an exposed end 134. The outlet 133 may be larger than the outlet 128 of the ball jet 124. The outlet 128 of the ball jet 124 may be sized and shaped to deliver a fluid stream having a relatively small and constant diameter. In contrast, the outlet 133 of the fluidic insert 132 may be larger than that of the outlet 128, and may be configured to deliver a fluid stream that is wider and larger than that delivered by the ball jet 124. For example, the outlet 133 may include a radially expanding shape (which expands from an interior portion to the exposed 134) in order to deliver a radially expanding or fan-shaped fluid stream.

The ball jet 124 may be configured to output a concentrated, focused fluid stream. The fluid stream is focused onto a specific spot or location on a windshield. In contrast, the fluidic insert 132 may be configured to output a wide, dispersed fluid stream. The wide fluid stream is dispersed in that it may fan out over a wide area that is larger than the specific spot or location onto which the concentrated fluid stream of the ball jet 124 is focused.

Each internal chamber 122 of the ball jet lines 108 and 110 and the internal chamber 130 of the fluidic line 112 may be aligned with respect to the common longitudinal plane 140 that extends through a length of the main housing 102. For example, centers of each of the internal chambers 122 and the internal chamber 130 may be positioned in the common plane 140. Outlets, such as the outlet 128 and the outlet 133, may include portions within the common plane 140. As such, all of the outlets may be configured to eject wiper fluid with respect to the common axis or plane 140. As such, a clearance area formed in a portion of the vehicle may be reduced in height, for example. Alternatively, the internal chambers 122 and the internal chamber 130 may not be aligned with respect to the plane 140.

While not shown, the nozzle assembly 100 may include more or less ball jet lines/outlets than shown. Also, the nozzle assembly 100 may include additional fluidic lines/outlets. In at least one embodiment, the nozzle assembly 100 may include at least two fluidic lines/outlets and at least two ball jet lines/outlets.

The connecting bracket 104 may include a cover 150 connected to a rear wall 152, lateral walls 154, and a front frame 156. The cover 150 fits over the fluidic line 112, while the lateral walls 154 pivotally connect to circular studs 155 extending outwardly from lateral surfaces of the fluidic line 112. For example, the lateral walls 154 include reciprocal recesses 158 that pivotally secure around portions of the studs 155. The interface between the studs and the recesses 158 allows the connecting bracket 104 to be adjusted to desired positions with respect to the main housing 102. As explained below, the rear wall 152 may include an adjustment channel that is configured to engage a portion of the main housing 102 to securely position the connecting bracket 104 to a desired position with respect to the main housing 102.

Figure 3:
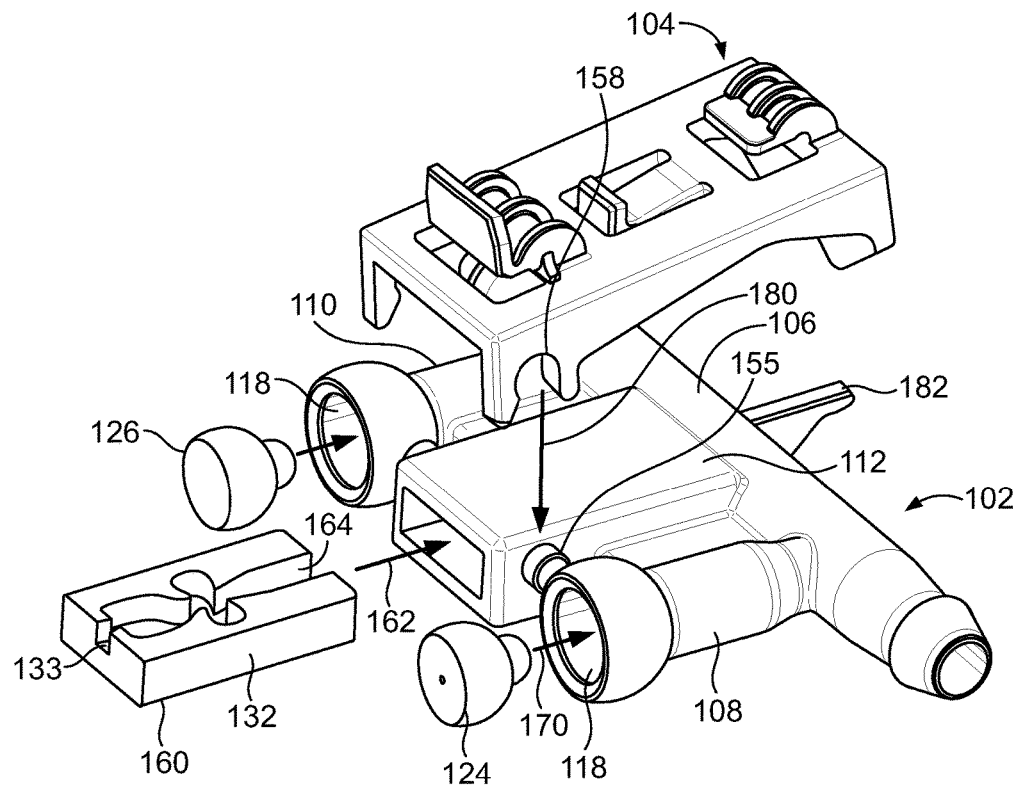
FIG. 3 illustrates a perspective top exploded view of a nozzle assembly, according to an embodiment of the present disclosure.

FIG. 3 illustrates a perspective top exploded view of the nozzle assembly 100. The fluidic insert 132 may be a block shaped cartridge 160 that is configured to be inserted into the internal chamber 130 of the fluidic line 112 in the direction of arrow 162. The fluidic insert 132 includes a central channel 164 formed therethrough that connects to the outlet 133. As such, washer fluid 114 that passes into the fluidic line 112 through the central fluid feed line 106 passes into and through the outlet 133 through the central channel 164. As shown, the fluidic insert 132 is configured to be removably secured to the fluidic line 112. Alternatively, the fluidic line 112 may be integrally and permanently formed with a central channel and outlet.

The ball jet 124 is configured to be press fit into the bearing 118 of the ball jet line 108 in the direction of arrow 170. Similarly, the ball plug 126 is configured to be press fit into the bearing 118 of the ball jet line 110 in the direction of arrow 172. As noted above, the ball jet 124 and the ball plug 126 are configured to be removably and interchangeably secured to the ball jet lines 108 and 110.

The connecting bracket 104 is configured to be secured to the main housing 102 such that the recesses 158 are aligned with respective studs 155 and urged thereon in the direction of arrow 180. For example, the recesses 158 may snapably secure the connecting bracket 104 onto the studs 155.

An adjustment beam 182 may outwardly extend from a rear of the main housing 102. An adjustment channel of the connecting bracket 104 is configured to adjustably secure to the adjustment beam 182 to adjustably position the connecting bracket 104 to the main housing 102 (and therefore the main housing 102 to a portion of a vehicle).

Figure 4:
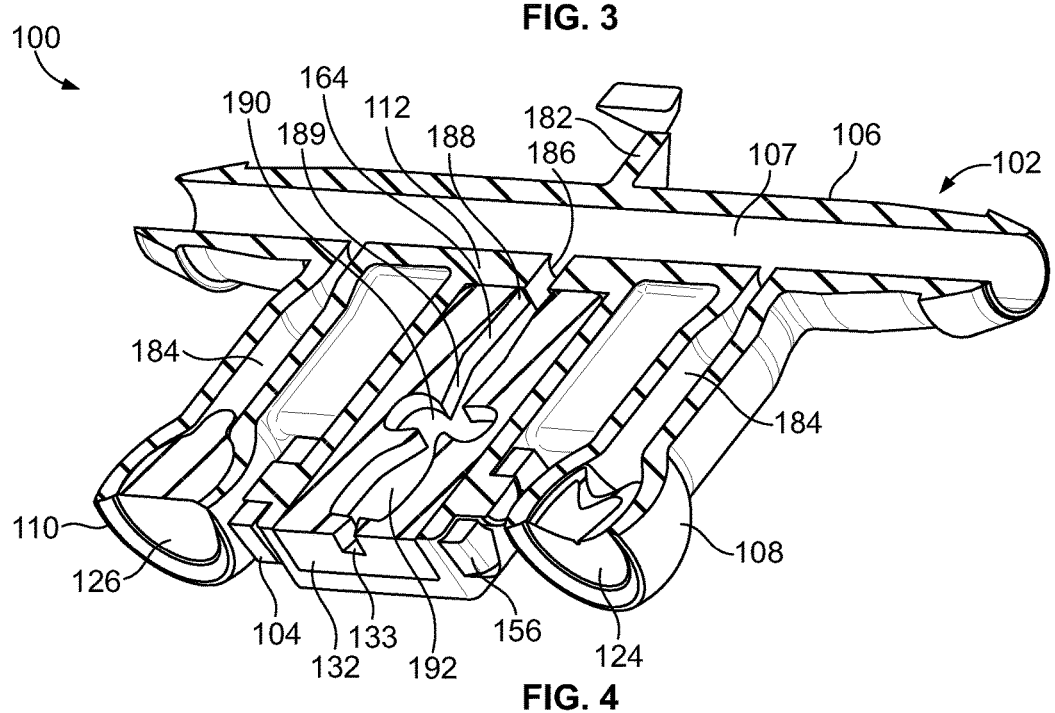
FIG. 4 illustrates a perspective cross-sectional view of a main body of a nozzle assembly through line 4-4 of FIG. 1, according to an embodiment of the present disclosure.

FIG. 4 illustrates a perspective cross-sectional view of the main housing 102 of the nozzle assembly 100 through line 4-4 of FIG. 1, according to an embodiment of the present disclosure. The fluid delivery channel 107 of the central fluid feed line 106 is in fluid communication with ball jet channels 184 formed through the ball jet lines 108 and 110, and a fluidic channel 186 formed through the fluidic line 112. The central channel 164 of the fluidic insert 132 connects the fluidic channel 186 to the outlet 133.

The central channel 164 may include an expanded inlet 188 that couples to the fluidic channel 186. The expanded inlet 188 may connect to a tapered segment 189 that tapers toward a constricted center 190 of the fluidic insert 132. The constricted center 190 may connect to an outwardly flared segment 192 that may be wider than the expanded inlet 188. The outwardly flared segment 192 connects to the outlet 133, which may have a diameter or width that is substantially smaller than the segment 192. The size and shape of the central channel 164 is configured to deliver an outwardly expanding, dispersed stream of washer fluid out of the outlet 133. For example, the shape of the fluid expelled out through the outlet 133 may be fan shaped.

Figure 5:
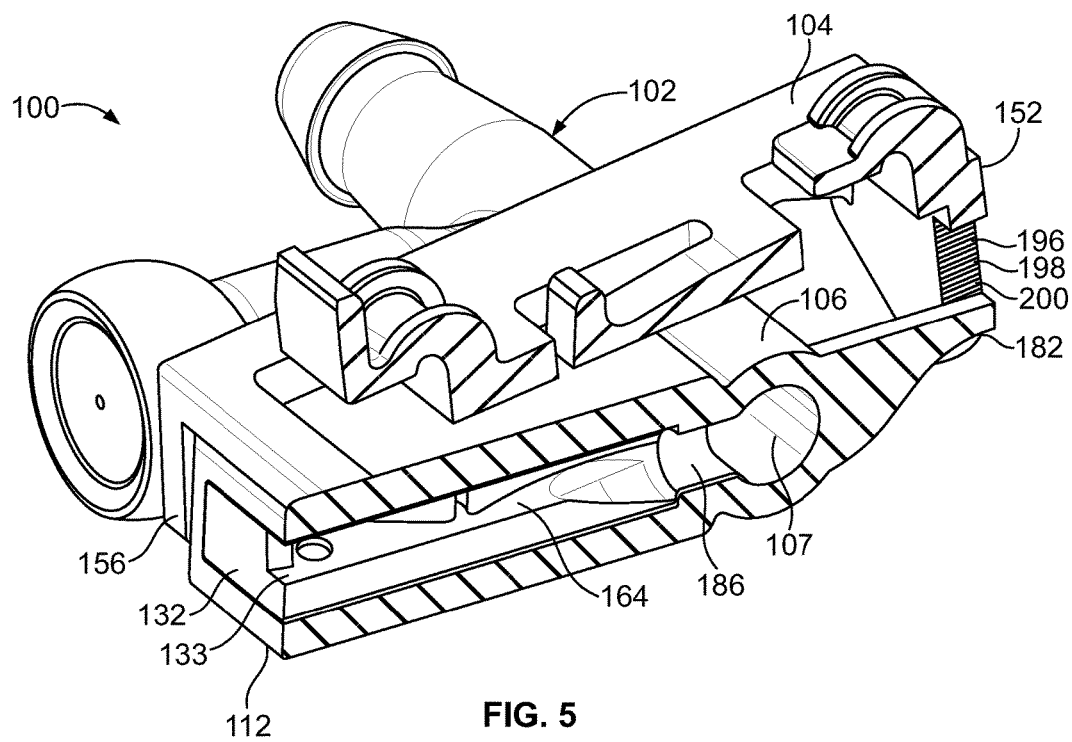
FIG. 5 illustrates a perspective cross-sectional view of a nozzle assembly through line 5-5 of FIG. 1, according to an embodiment of the present disclosure.

FIG. 5 illustrates a perspective cross-sectional view of the nozzle assembly 100 through line 5-5 of FIG. 1, according to an embodiment of the present disclosure. The rear wall 152 of the connecting bracket 104 includes a vertical adjustment channel 196. Internal edges 198 that define the adjustment channel 196 may include teeth 200 that are configured to securely latch onto the adjustment beam 182 of the main housing 102, in order to securely position the main housing 102 at a desired position relative to the connecting bracket 104.

Figure 6:
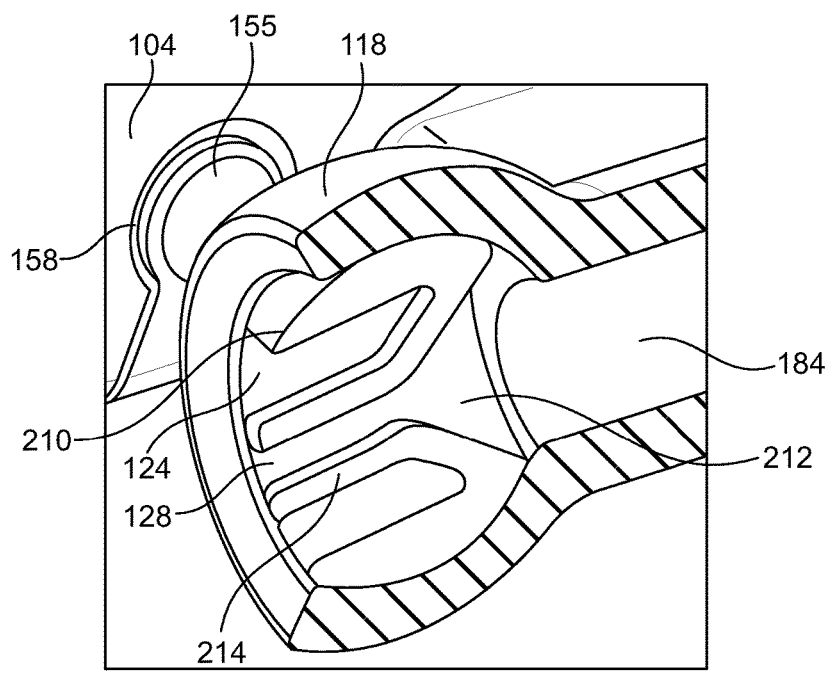
FIG. 6 illustrates a perspective axial cross-sectional view of a ball jet secured within a bearing of a ball jet line, according to an embodiment of the present disclosure.

FIG. 6 illustrates a perspective axial cross-sectional view of the ball jet 124 secured within the bearing 118 of the ball jet line 108, according to an embodiment of the present disclosure. As shown, the ball jet 124 includes a semispherical main body 210 that fits within the bearing 1109. A fluid inlet 212 within the ball jet 124 is in fluid communication with the ball jet channel 184 formed through the ball jet line 108. The fluid inlet 212 tapers down towards the outlet 128. In particular, the fluid inlet 212 funnels down to a linear passage 214 that connects to the outlet 128. The linear passage 214 has a diameter that is less than that of the fluid inlet 212. The linear passage 214 and the outlet 128 may have the same diameter. In this manner, fluid is directed into the fluid inlet 212 and pressurized through the linear passage 214. The pressurized fluid is then expelled through the outlet 128 having a relatively small diameter (compared to the outlet 133) that is substantially similar to that of the outlet 128. In contrast to the outlet 133 of the fluidic insert 132 (shown in FIGS. 2-5), which is configured to deliver an outwardly-flared or fan shaped fluid stream, the outlet 128 of the ball jet 124 is configured to deliver a pressurized and concentrated fluid stream having a relatively constant diameter. In this manner, the ball jet 124 is configured to deliver a jet stream of fluid that may be focused and directed at a specific location on a windshield, while the fluidic insert is configured to deliver a wide stream of fluid that may be directed over a wider area of the windshield.

Figure 7:
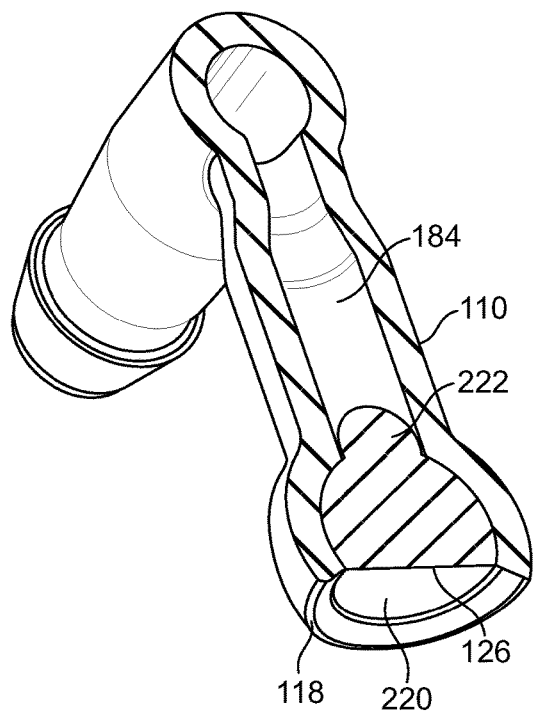
FIG. 7 illustrates a perspective axial cross-sectional view of a ball plug secured within a bearing of a ball jet line, according to an embodiment of the present disclosure.

FIG. 7 illustrates a perspective axial cross-sectional view of a ball plug 126 secured within the bearing 118 of the ball jet line 110, according to an embodiment of the present disclosure. The ball plug 126 may include a main body 220 having a semispherical shape. A protuberance 222 may extend outwardly from the main body 220 and secure within a distal end of the ball jet channel 184 formed through the ball jet line 110, thereby stabilizing the ball plug 126 within the ball jet channel 184. As shown, the ball plug 126 does not include a fluid line formed therethrough. Instead, the ball plug 126 is configured to plug the ball jet channel 184 to prevent fluid emission.

Figure 8:
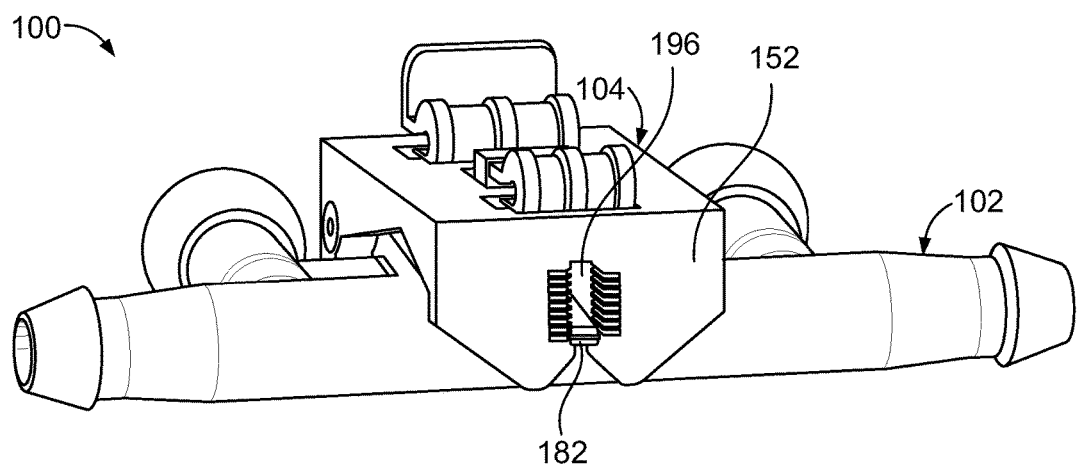
FIG. 8 illustrates a perspective rear view of a nozzle assembly, according to an embodiment of the present disclosure.
Figure 9:
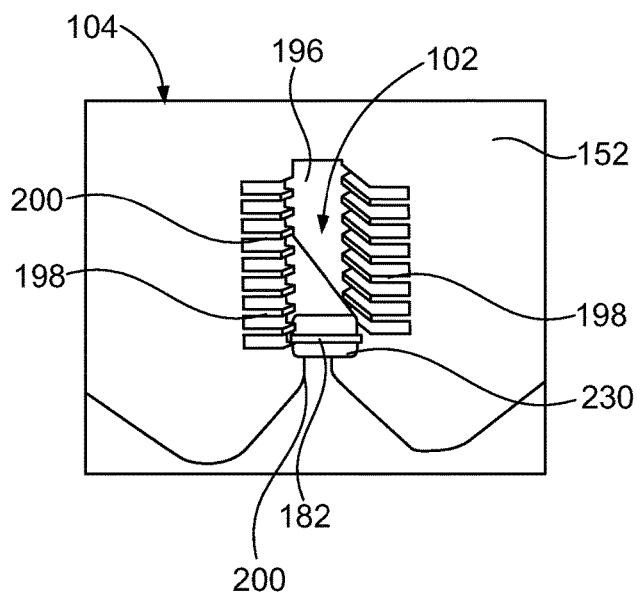
FIG. 9 illustrates a rear view of a rear wall of a connecting bracket adjustably secured to an adjustment beam extending from a main body, according to an embodiment of the present disclosure.

FIG. 8 illustrates a perspective rear view of the nozzle assembly 100, according to an embodiment of the present disclosure. FIG. 9 illustrates a rear view of the rear wall 152 of the connecting bracket 104 adjustably secured to the adjustment beam 182 extending from the main housing 102, according to an embodiment of the present disclosure. Referring to FIGS. 8 and 9, the rear wall 152 of the connecting bracket 104 includes the vertical adjustment channel 196. Internal edges 198 that define the adjustment channel 196 may include teeth 200 that are configured to securely latch onto the adjustment beam 182, in order to securely position the main housing 102 at a desired position relative to the connecting bracket 104. As shown, the adjustment beam 182 may include an outwardly extending tab 230 that is securely sandwiched between two sets of horizontally aligned teeth 200.

In order to adjust the main housing 102 with respect to the connecting bracket 104, the tab 230 may be removed from the teeth 200. After being removed, the main housing 102 may be pivoted with respect to the connecting bracket 104, such as by a pivotal engagement with the studs 155 (as described above with respect to FIG. 1). At a desired position, the tab 230 may be re-engaged by the adjustment channel 196 to secure the main housing 102 in position relative to the connecting beam 104.

Optionally, one or more fasteners, such as screws, may be used to adjust the connecting bracket 104 with respect to the main housing 102. The rear wall 152 of the bracket may include a scale that indicates a desired height through gradient or level indicators, for example.

The connecting bracket 104 secures the nozzle assembly 100 to a portion of a vehicle, such as to a frame underneath a hood of the vehicle. The connecting bracket 104 may adjustably secure to the main housing 102 through various other interfaces and components. For example, the connecting bracket 104 may include one or more latches that removably secure to portions of the main housing 102. In at least one other embodiment, the connecting bracket 104 may include one or more clasps, barbs, tabs/slots, or the like that are configured to removably secure to reciprocal portions of the main housing 102. Alternatively, the nozzle assembly 100 may not be adjustable with respect to the connecting bracket 104 or to a portion of vehicle Alternatively, the nozzle assembly 100 may not include a separate and distinct connecting bracket 104. Instead, the nozzle assembly 100 may be secured to a portion of a vehicle.

Figure 10:
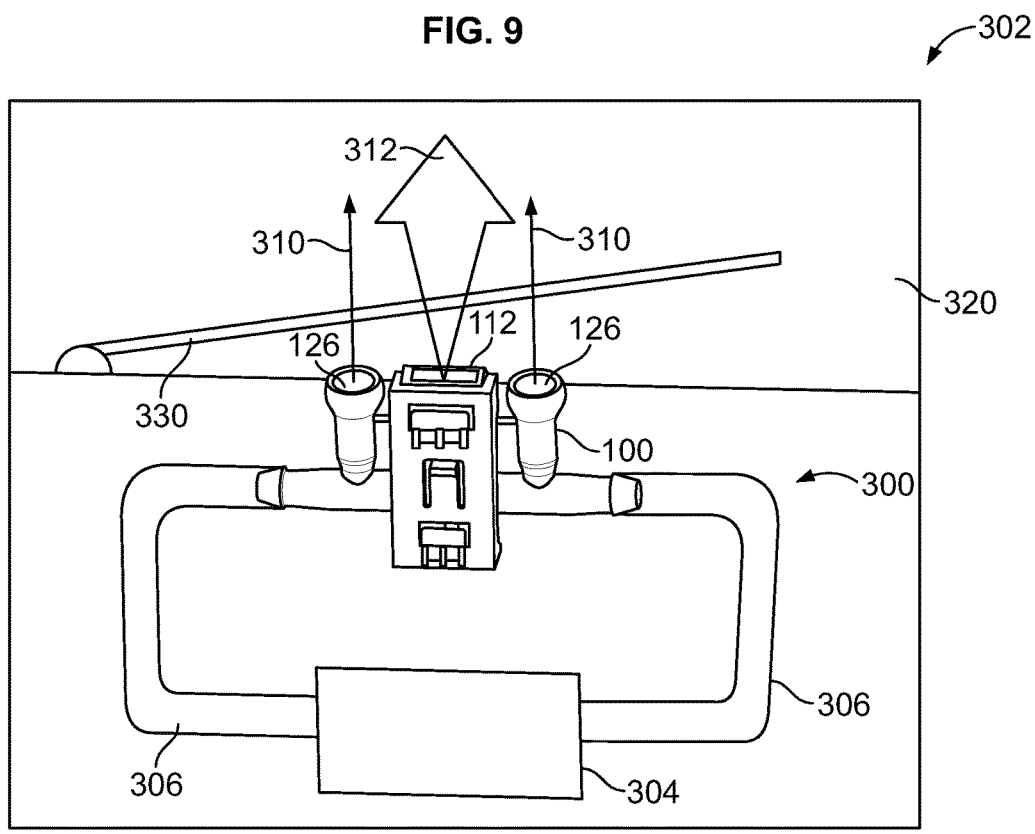
FIG. 10 illustrates a simplified schematic view of a windshield washer system of a vehicle, according to an embodiment of the present disclosure.

FIG. 10 illustrates a simplified schematic view of a windshield washer system 300 of a vehicle 302, according to an embodiment of the present disclosure. The windshield washer system 300 may include a washer fluid storage tank 304 that retains washer fluid. The washer fluid storage tank 304 is coupled to one or more nozzle assemblies 100 through fluid delivery tubes 306 that connect to the fluid delivery line 106. As shown in FIG. 10, the nozzle assembly 100 may include active ball jets 126 within each of the ball jet lines 108 and 110.

When the windshield washer system 100 is activated, washer fluid from the washer fluid storage tank 304 is delivered to the nozzle assembly 100 through the fluid delivery tubes 306. The ball jets 126 focus and direct the washer fluid 310 onto specific, small spots or locations of a windshield 320, while the fluid insert 112 delivers a wide area fluid emission 312 onto a larger area of the windshield 320. One or more windshield wipers 330 are then activated to remove the fluid and debris from the windshield 320.

Referring to FIGS. 1-10, the nozzle assembly 100 may be adapted to a particular desired configuration. For example, each ball jet line may retain a ball jet or a ball plug. Ball jets may be added or removed as desired. The nozzle assembly 100 may include two ball jets, or two ball plugs. Further, the nozzle assembly 100 may include only one ball jet line, or more than two ball jet lines. Additionally, the nozzle assembly 100 may include more than one fluidic line.

Embodiments of the present disclosure may include heating elements. For example, a nozzle assembly may include one or more heating elements (such as a heating coil, resistor, or the like) that may be used to heat one or more ball jet lines and/or one or more fluidic lines to prevent or otherwise reduce the risk of the washer fluid freezing. Additionally, or alternatively, embodiments of the present disclosure may include one or more valves that may control a rate of fluid flow through the ball jet lines and/or the fluidic lines. In at least one embodiment, a valve may be used to prevent fluid from backwashing into a fluid feed line and/or a fluid storage tank.

Figure 11:
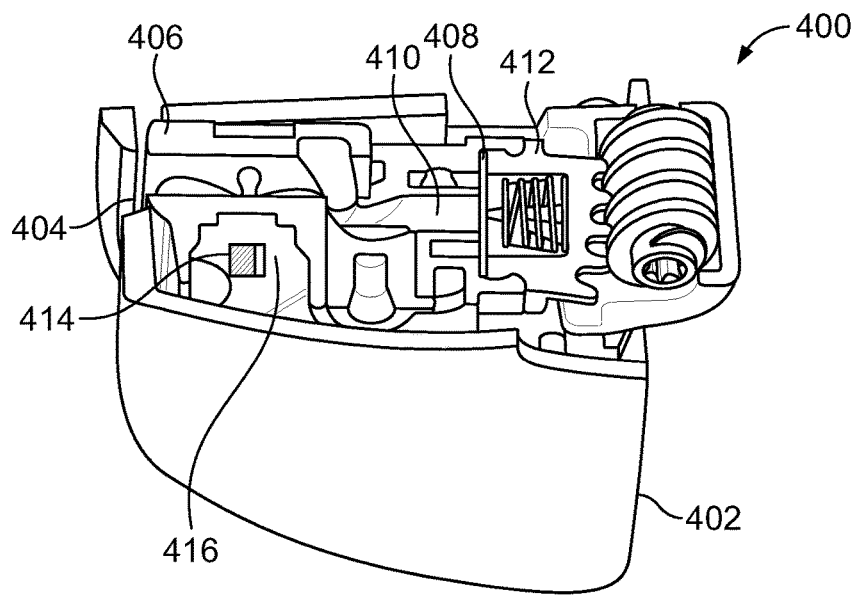
FIG. 11 illustrates a perspective internal cross-sectional view of a nozzle assembly, according to an embodiment of the present disclosure.

FIG. 11 illustrates a perspective internal cross-sectional view of a nozzle assembly 400, according to an embodiment of the present disclosure. The nozzle assembly 400 is similar to the nozzle assemblies described above. The nozzle assembly 400 may include a protective cover 402. An opening 404 may be formed through a portion of the protective cover 402. The opening 404 is configured to expose output ends of one or more fluidic lines 406 and one or more ball jet lines (hidden from view in FIG. 11).

A valve 408 may be operatively coupled to a fluid delivery line 410. The valve 410 may be a check valve or non-return valve that is configured to prevent water from flowing back towards a washer fluid storage tank. The valve 408 may include a spring-loaded membrane 412. The valve 408 operates to ensure a direct flow of washer fluid is supplied to the fluidic line 406 and/or the ball jet lines. For example, a hose or tube coupled to the nozzle assembly 400 may already be filled with washer fluid. The valve 408 operates to ensure that the washer fluid is delivered to the fluidic line 406 and/or the ball jet lines without the fluid backwashing into the fluid storage tank. Further, the valve 408 minimizes or otherwise reduces any delay between fluid delivery to a windshield that may otherwise arise when the hose or tube is filled with washer fluid.

The nozzle assembly 400 may also include a heating element 414, such as a ceramic resistor, heating coil, or the like. The heating element 414 may be secured within a pocket 416 formed in the nozzle assembly 400. The heating element 414 may be removably secured within the pocket 416, such as through one or more snap, latch, or other such connections. In at least one embodiment the heating element 414 may be adhesively secured within the pocket 416, such as through an epoxy glue. The heating element 414 operates to prevent ice from forming at or proximate to the outputs of the fluidic line and the ball jet lines, such as at the opening 404.

Figure 12:
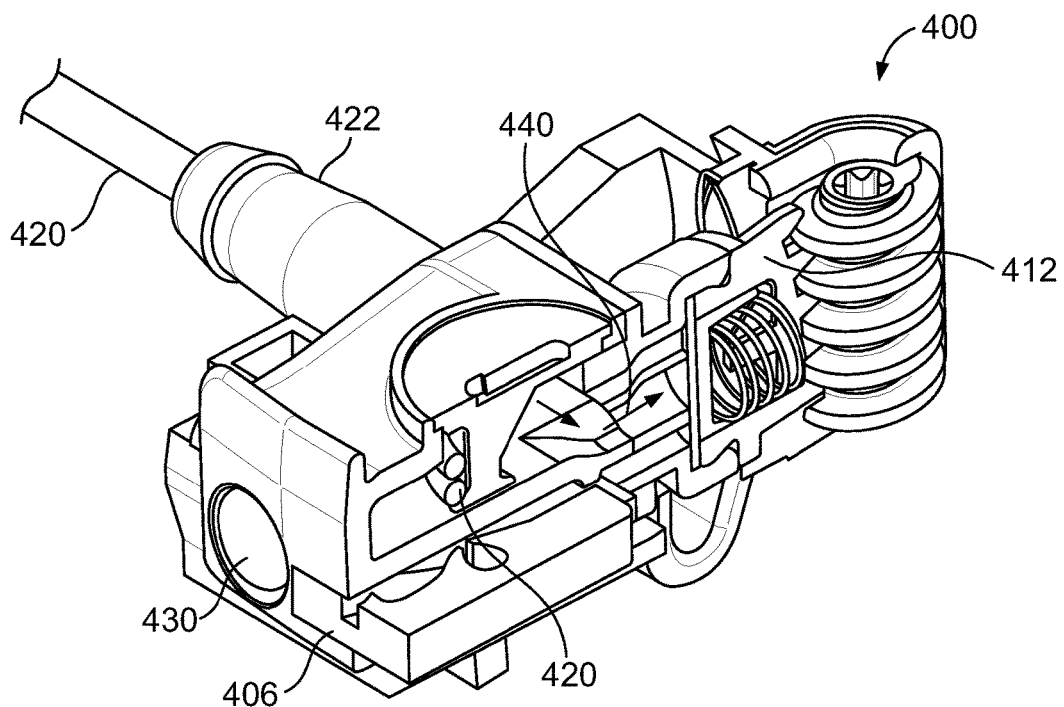
FIG. 12 illustrates a perspective front partial cross-sectional view of a nozzle assembly, according to an embodiment of the present disclosure.

FIG. 12 illustrates a perspective front partial cross-sectional view of the nozzle assembly 400, according to an embodiment of the present disclosure. A heating cable 420 may be positioned within or on a fluid delivery tube or hose. The heating cable 420 may extend into the nozzle assembly 400, such as through a fluid feed line 422. The heating cable 420 is used to prevent ice from forming within the fluid delivery tube or hose and within the nozzle assembly 400. Accordingly, fluid delivered to the fluidic line 406 and the ball jet lines 430 may be heated and prevented from freezing through the heating cable 420 and/or the heating element 414 (shown in FIG. 11).

As shown in FIG. 12, as washer fluid 440 passes into the nozzle assembly 400, the pressure of the washer fluid 440 urges the spring-loaded membrane 412 into an open position, which allows the washer fluid 440 to flow to the fluidic line 406 and the ball jet lines 430. As the pressure of the washer fluid decreases, the spring-loaded membrane 412 moves back to an at-rest position, which may close off the path to the fluid feed line 422, thereby ensuring that any fluid within the nozzle assembly 400 does not backwash towards a washer fluid storage tank.

Embodiments of the present disclosure provide a nozzle assembly that provides a manufacturer with increased flexibility and options. The nozzle assembly may be adapted and changed. Any of the outputs, including the ball jet outputs and fluidic outputs, may be used, or not used. For example, a manufacturer may opt for a wider, lower pressure output from a fluidic insert without the higher pressure, concentrated ball jet outputs. Conversely, a manufacturer may prefer the concentrated high pressure outputs of the ball jets over the fluidic insert option. Further, a manufacturer may opt for both a wide fluidic outlet, and at least one high pressure, concentrated ball jet output. Embodiments of the present disclosure provide a manufacturer with the option of one or more ball jet fluid outputs, one or more wide fluidic outputs, or both.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A nozzle assembly of a windshield washer system of a vehicle, the nozzle assembly comprising:
    a fluid feed line that is configured to receive washer fluid from a washer fluid storage tank;
    at least one ball jet line coupled to the fluid feed line;
    at least one fluidic line coupled to the fluid feed line; and
    a connecting bracket that is configured to secure the nozzle assembly to a portion of the vehicle, wherein a position of the connecting bracket in relation to the nozzle assembly is adjustable.

2. The nozzle assembly of claim 1, wherein the at least one ball jet line removably and selectively retains one of a ball jet or a ball plug, wherein the ball jet is configured to deliver a pressurized and concentrated stream of washer fluid.

3. The nozzle assembly of claim 1, wherein the at least one fluidic line retains a fluidic insert that is configured to deliver a wide stream of washer fluid.

4. The nozzle assembly of claim 1, wherein the at least one fluidic line retains a fluidic plug.

5. The nozzle assembly of claim 1, wherein the at least one ball jet line comprises first and second ball jet line, wherein the at least one fluidic line comprises a central fluidic line, wherein the first ball jet line is positioned in relation to a first side of the central fluidic line, and wherein the second ball jet line is positioned in relation to a second side of the central fluidic line that is opposite the first side.

6. The nozzle assembly of claim 5, wherein the first ball jet line retains a first ball jet, and wherein the second ball jet line retains a first ball plug.

7. The nozzle assembly of claim 5, wherein the first ball jet line retains a first ball jet, and wherein the second ball jet line retains a second ball jet.

8. The nozzle assembly of claim 5, wherein the first ball jet line retains a first ball plug, and wherein the second ball jet line retains a second ball plug.

9. The nozzle assembly of claim 1, wherein the at least one ball jet line and the at least one fluidic line include portions that are disposed within a plane that extends into a longitudinal plane of the nozzle assembly.

10. The nozzle assembly of claim 1, further comprising one or more of at least one heating element that is configured to heat the washer fluid; and a valve that is configured to control flow of the washer fluid.

11. A windshield washer system configured to clean a windshield of a vehicle, the windshield washer system comprising:
    a washer fluid storage tank configured to retain washer fluid; and
    at least one nozzle assembly connected to the washer fluid storage tank through at least one fluid delivery tube, the at least one nozzle assembly comprising:
        a fluid feed line that is configured to receive washer fluid from a washer fluid storage tank;
        at least one ball jet line coupled to the fluid feed line;
        at least one fluidic line coupled to the fluid feed line; and
        a connecting bracket that is configured to secure the nozzle assembly to a portion of the vehicle, wherein a position of the connecting bracket in relation to the at least one nozzle assembly is adjustable.

12. The windshield washer system of claim 11, wherein the at least one ball jet line removably and selectively retains one of a ball jet or a ball plug, wherein the ball jet is configured to deliver a pressurized and concentrated stream of washer fluid.

13. The windshield washer system of claim 11, wherein the at least one fluidic line retains a fluidic insert that is configured to deliver a wide stream of washer fluid.

14. The windshield washer system of claim 11, wherein the at least one ball jet line comprises first and second ball jet lines, wherein the at least one fluidic line comprises a central fluidic line, wherein the first ball jet line is positioned in relation to a first side of the central fluidic line, and wherein the second ball jet line is positioned in relation to a second side of the central fluidic line that is opposite the first side.

15. The windshield washer system of claim 14, wherein each of the first and second ball jet line removably retains one a ball jet or a ball plug.

16. A nozzle assembly of a windshield washer system of a vehicle, the nozzle assembly comprising:
    a fluid feed line that is configured to receive washer fluid from a washer fluid storage tank;
    a central fluidic line coupled to the fluid feed line, wherein the central fluidic line has a first side and a second side that is opposite from the first side;
    a fluidic insert removably retained by the central fluidic line, wherein the fluid insert is configured to deliver a wide stream of washer fluid;
    a first ball jet line coupled to the fluid feed line, wherein the first ball jet line is positioned in relation to the first side of the central fluidic line, wherein the first ball jet line removably and selectively retains one of a first ball jet or a first ball plug, wherein the first ball jet is configured to deliver a first pressurized and concentrated stream of washer fluid;
    a second ball jet line coupled to the fluid feed line, wherein the second ball jet line is positioned in relation to the second side of the central fluidic line, wherein the second ball jet line removably and selectively retains one of a second ball jet or a second ball plug, wherein the second ball jet is configured to deliver a second pressurized and concentrated stream of washer fluid, wherein the first ball jet line, the second ball jet line, and the central fluidic line include portions that are disposed within a plane that extends into a longitudinal plane of the nozzle assembly; and
    a connecting bracket that is configured to secure the nozzle assembly to a portion of the vehicle, wherein a position of the connecting bracket in relation to the nozzle assembly is adjustable.

* * * * *

UNITED STATES PATENT AND TRADEMARK OFFICE
CERTIFICATE OF CORRECTION

PATENT NO. : 10,486,654 B2
APPLICATION NO. : 15/544290
DATED : November 26, 2019
INVENTOR(S) : Kristian A. Ostergren Page 1 of 1

It is certified that error appears in the above-identified patent and that said Letters Patent is hereby corrected as shown below:

On the Title Page

In item (22), the PCT Filed date "Feb. 17, 2015," should read --Dec. 17, 2015--.

Signed and Sealed this
Eighteenth Day of February, 2020

Andrei Iancu
*Director of the United States Patent and Trademark Office*